Dec. 4, 1923. 1,476,237
G. B. BOWELL
MEANS FOR THE PROJECTION OF CINEMATOGRAPH FILMS
Filed Aug. 27, 1921  2 Sheets-Sheet 1
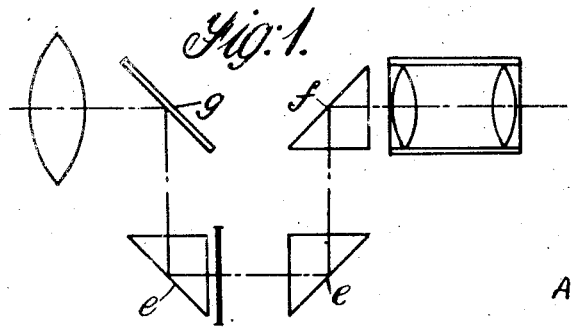
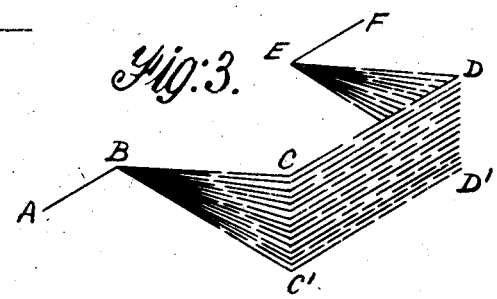
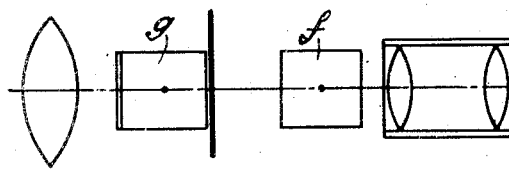
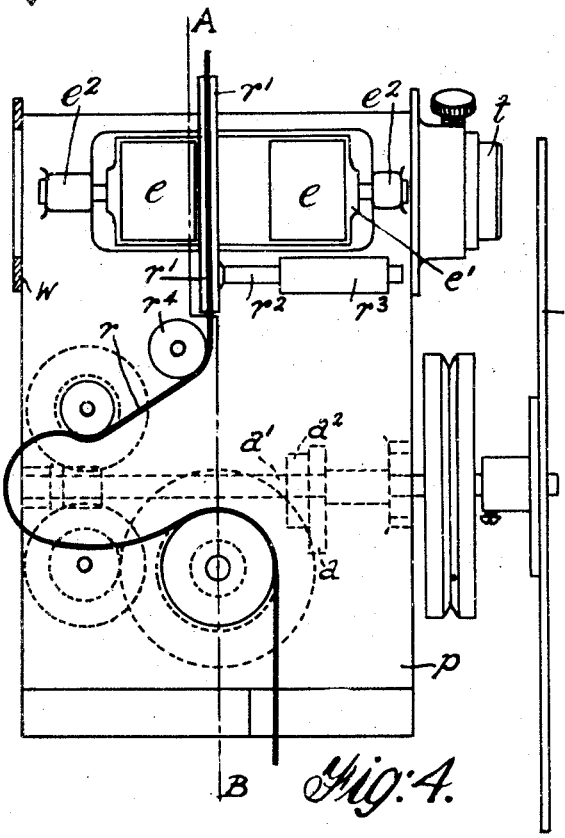
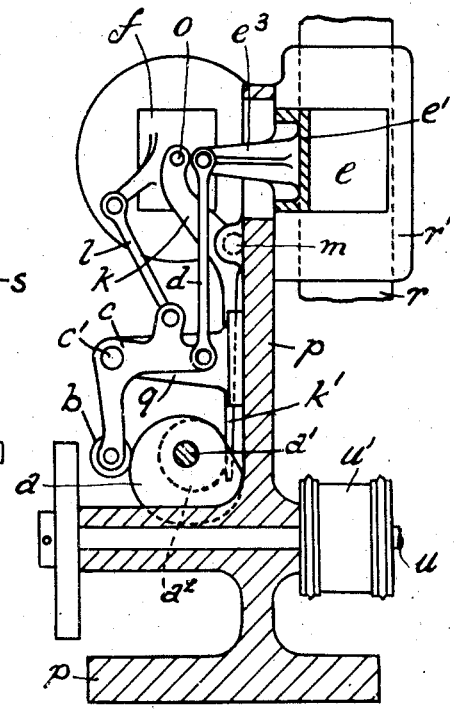
INVENTOR.
George Bennett Bowell.
by Arthur J. Stephens
Attorney.

Dec. 4, 1923.　　　　　　　　　　　　　　1,476,237
G. B. BOWELL
MEANS FOR THE PROJECTION OF CINEMATOGRAPH FILMS
Filed Aug. 27, 1921　　　2 Sheets-Sheet 2

INVENTOR.
George Bennett Bowell.
by Arthur J. Stephens
Attorney.

Patented Dec. 4, 1923.

1,476,237

UNITED STATES PATENT OFFICE.

GEORGE B. BOWELL, OF HIGH BARNET, ENGLAND, ASSIGNOR OF ONE-HALF TO GILBERT RICHARD REDGRAVE, OF LONDON, ENGLAND.

MEANS FOR THE PROJECTION OF CINEMATOGRAPH FILMS.

Application filed August 27, 1921. Serial No. 496,061.

*To all whom it may concern:*

Be it known that I, GEORGE BENNETT BOWELL, a subject of the King of Great Britain and Ireland, residing at 20 Bedford Avenue, High Barnet, Hertfordshire, England, have invented new and useful Improved Means for the Projection of Cinematograph Films (on which application has been made for Letters Patent in Great Britain, No. 25,986, filed 8th September, 1920), of which the following is a specification.

The present invention relates to improved means for the projection of cinematograph films. In the ordinary construction of projecting mechanisms the film is intermittently advanced picture by picture usually at the rate of sixteen per second, the light necessarily being obturated during the change to the next picture and since obturations at so slow a rate as sixteen per second must of necessity cause severe flickering, it is usual to form the shutter so as to give two extra obturations during the cycle of each film change. It has further been well established that all these obturations ought to be of equal duration, and that each duration should take one sixth of the time occupied by each cycle. This however, involves difficulties as it necessitates starting moving and stopping the film in a time approximately equal to one eighth of a sixteenth of a second.

In order to prevent the flickering which occurs from intermittently moving films, it was proposed many years ago to employ a continuously moving film and to deflect the beam of light through an arrangement of moving mirrors.

Briefly stated the present invention comprises the use in such a projector of a system of reflecting parts adapted to be oscillated about an axis or axes parallel with the optical axis of projection and about axes perpendicular to the plane of the film. The simplest form of my invention comprises a pair of reflecting mirrors oscillating about an axis parallel with the optical axis of projection and having their surfaces inclined 45° more or less to the optical axis. Such a pair of mirrors are usually combined with two other similarly disposed mirrors for the purpose of maintaining relatively constant the optical axis from the light source to the film picture, My invention is more particularly described in the accompanying drawings, in which—

Figure 1 shows a diagrammatic plan view of the optical parts.

Figure 2 shows a side view of Figure 1.

Figure 3 shows a diagrammatic isometrical view illustrating the optical axis.

Figure 4 shows a front view of the mechanism for operating the optical parts shown diagrammatically in Figures 1 and 2.

Figure 5 shows a sectional side view on the line A, B of Figure 4.

Referring now to Figures 1 and 2 of the drawings the reflecting surfaces are arranged so that the first and last reflection, each of 90° is effected by the mirrors $g$ and $f$ attached to a rotatable spindle, the light being reflected through two more reflecting surfaces $e$, $e$ of 90° moving about another axis but parallel to the axis of the first and last reflecting surfaces $g$ and $f$.

Figure 3 illustrates diagrammatically the optical axis which as shown is constant along A, B and E, F, but changing cyclically its position from C, D, to C′, D′, during the movement of the reflecting surfaces $g$, $f$ and $e$, $e$ upon their axes.

A suitable mechanism for operating the optical parts shown diagrammatically in Figures 1 and 2 is illustrated by way of example in Figures 4, 5, 6 and 7. The reflecting mirror $g$ and the prism $f$ are mounted upon the spindle $o$ which is journalled upon the bracket $k$ which bracket is journalled upon a spindle mounted in the bearings $m$, $m$ on the main framework $p$ of the machine. The reflecting prism $f$ connected by an arm on its rear face as shown more particularly in Figure 5 through a link $l$ with a bell crank lever $c$ pivotally mounted at $c'$ on the bracket $q$ carried by the main framework $p$. The free end of this bell crank lever is provided with a roller $b$ bearing upon the periphery of the main cam $a$ mounted on the driving shaft $a'$. It will be readily understood that the rotation of the cam $a$ will turn through the bell crank lever $c$ and the link $l$, the prism $f$ and consequently the reflecting surface $g$ on their spindle $o$ journalled in bearings on the bracket $k$.

Figures 6, 7:
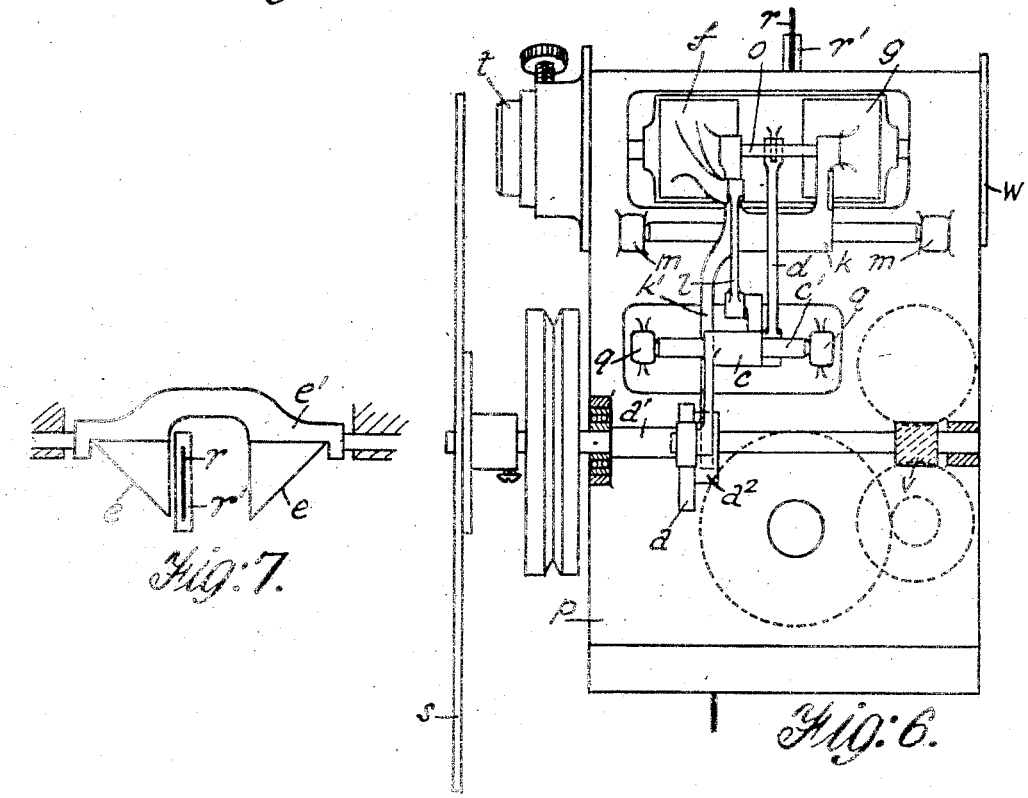
Figure 6 shows a rear view of the operating mechanism.
Figure 7 shows a detail view of the yoke carrying the front pair of prisms.

In order that the secondary prisms, $e, e$ may have a corresponding movement these prisms are mounted on the yoke $e'$ shown in detail in Figure 7 which yoke is pivotally mounted in the bracket $e^2$ as shown more particularly in Figure 4. The yoke $e'$ is provided with an arm $e^3$ on its rear face which arm is connected by the link $d$ with the bell crank lever $c$. It will be obvious that by this arrangement a simultaneous turning movement is given respectively to the pairs of reflecting surfaces $g, f$ and $e, e$, on their trunnions through the main cam $a$ and bell crank lever $c$.

It is important to compensate for the curved nature of the path of light between curvilinear prisms $e, e$, resulting from the curvilinear motion applied to the various reflecting surfaces and in order to compensate for the curve in the said reflected light during this curvilinear motion, I provide a downwardly depending arm on the pivotally mounted bracket $k$ which carries said reflecting surfaces. This arm $k'$ engages with a cam $a^2$ mounted on the same shaft as the main cam $a$. The cam $a^2$ is adapted to move said reflecting surfaces $g, f$ laterally through the bracket $k$ carrying said surfaces during the half-turn movement given to said reflecting surfaces by the main cam $a$. The film $r$ is adapted to move through the gate $r'$ between the pair of reflecting surfaces $e, e$ as shown more particularly in Figures 5, 6 and 7. One side of the gate is mounted on the spindle $r^2$ carried in the bracket $r^3$. The shutter $s$ is mounted on the same spindle as the cams $a$ and $a^2$. This shutter is adapted to obscure the lens $t$ during the return movement of the pairs of reflecting surfaces $g, f,$ and $e, e$.

Motion is imparted to the mechanism operating the optical parts through a handle or motor not shown, adapted to rotate the shaft $u$ carrying the film feeding pulley $u'$. This shaft is adapted to rotate through a counter-shaft and gearing; a wheel $v$ driving the cam shaft operating the above described mechanism. The beam of light passes from a condenser through a fixed aperture plate $w$ which plate is preferably considerably larger than picture size. Motion preferably by means of a suitable cam or cams is imparted to all four reflecting surfaces, whereby the optical axis through the whole system is maintained constantly as in a straight line relatively to the centre of each picture. Means for "framing" the picture are preferably provided by a planetary or differential gear in circuit with the drive to the film sprocket at the gate though a mere jockey roller such as $r^4$ may alternatively be used for this purpose.

Figure 8:
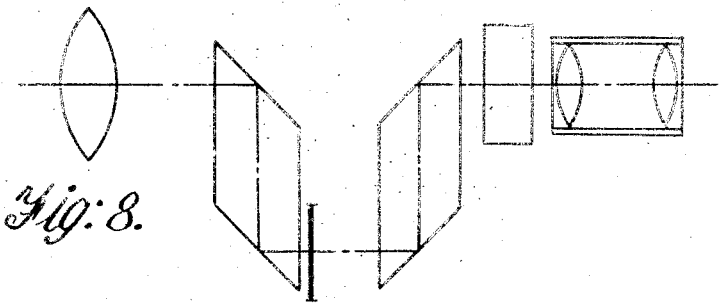
Figure 8 shows a diagrammatic plan view of the optical parts in an alternative arrangement, and, Figure 9 shows a side view of Figure 8.
Figure 9:
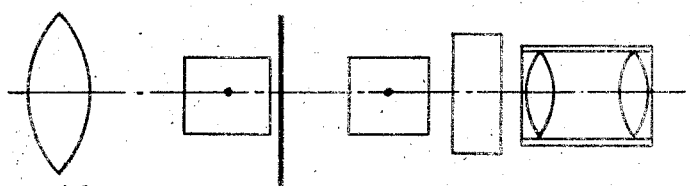

An alternative form of my invention is illustrated diagrammatically in Figures 8 and 9. In this form the light enters a prism situated between a fixed aperture plate and the film track a similar prism being provided on the other side of the film track. These two prisms are rigidly mounted in a common frame pivoted in an axis at right angles to the direction of film travel. Each prism causes two reflections of the optical axis. In this arrangement the optical axis is always maintained at right angles to the film track and in order to correct the small lateral error which is introduced a glass plate shown diagrammatically in Figures 8 and 9 is moved about a vertical axis under control of a suitable cam and situated preferably behind the projecting lens for compensating this movement.

In constructing a small machine according to this invention and where a source of light such as a Nernst lamp might conveniently be used, I may omit the first and second "or light switching" mirrors but the area of nearly two pictures must be covered by the light and in this case a moving mask may be added behind the gate.

What I claim is:—

1. Cinematograph projector mechanism of the continuously moving film kind, comprising a framework, means for continuously moving a film mounted in said framework, two systems of reflecting parts mounted in said framework, axes perpendicular to the film in the gate, means for oscillating said systems about said axes and a shutter mounted in said framework and adapted to be actuated by the operating mechanism synchronously with said oscillating system and said film moving means in such a manner that the reverse motion of said system occurs wholly during a period of shutter obturation.

2. Cinematograph projector mechanism of the continuously moving film kind, comprising a framework, means for continuously moving the film mounted in said framework, a pair of reflectors pivotally mounted in said framework with reflecting surfaces inclined at an angle of 45° to the optical axis of projection, means for oscillating said reflectors about an axis parallel with said optical axis, a second pair of reflectors pivotally mounted in said framework with reflecting surfaces inclined at an angle of 45° to the optical axis of projection, means for oscillating said second pair of reflectors in the optical axis, and a shutter mounted in said framework and adapted to be actuated by the operating mechanism synchronously with said oscillating reflectors and said film moving means in such a manner that the reverse motion of said reflectors occurs wholly during a period of shutter obturation.

3. Cinematograph projector mechanism of the continuously moving film kind, comprising a framework, means for continuously moving the film mounted in said framework, a pair of reflectors pivotally mounted in said framework, with reflecting surfaces inclined at an angle of 45° to the optical axis of projection, means for oscillating said reflectors about axes parallel with said optical axis, a second pair of reflectors similarly disposed to the first pair of reflectors and mounted on the axes of the said first pair of reflectors and adapted to maintain the optical axis from the light source to the film picture in a relatively constant position, means for oscillating said second pair of reflectors synchronously with said first pair of reflectors and a shutter mounted in said framework and adapted to be actuated by the operating mechanism synchronously with said oscillating reflectors and said film moving means in such a manner that the reverse motion of said reflectors occurs wholly during a period of shutter obturation.

4. Cinematograph projector mechanism of the continuously moving film kind, comprising a framework, a main driving shaft mounted in said framework, means for continuously moving the film mounted in said framework and driven by said main shaft, a counter-shaft adapted to be driven from said main driving shaft, cam mechanism mounted on said counter-shaft, a bell crank lever pivotally mounted in said framework and adapted to be rocked on its pivot by said came mechanism, a pair of reflectors pivotally mounted in said framework and inclined at an angle of 45° to the optical axis of projection, a second pair of reflectors similarly disposed to the first pair of reflectors and mounted on the axes of the said first pair of reflectors and adapted to maintain the optical axis from the light source to the film picture in a relatively constant position, a film gate mounted in said framework between said pairs of reflectors, link mechanism connecting said bell crank lever with the axes of said reflectors and adapted to transmit to said reflectors through the cam and bell crank lever an oscillation on their axes parallel with the optical axis and a shutter mounted in said framework and adapted to be actuated by the operating mechanism synchronously with said oscillating reflectors and said film moving means in such a manner that the reverse motion of said reflectors occurs wholly during a period of shutter obturation.

5. Cinematograph projector mechanism of the continuously moving film kind, comprising a framework, a main driving shaft mounted in said framework, means for continuously moving the film mounted in said framework and driven by said main shaft, a counter-shaft adapted to be driven from said main driving shaft, cam mechanism mounted on said counter-shaft, a bell crank lever pivotally mounted in said framework and adapted to be rocked on its pivot by said cam mechanism, a pair of reflectors pivotally mounted in said framework and inclined at an angle of 45° to the optical axis of projection, a second pair of reflectors similarly disposed to the first pair of reflectors and mounted on the axes of the said first pair of reflectors and adapted to maintain the optical axis from the light source to the film picture in a relatively constant position, a film gate mounted in said framework between said pairs of reflectors, link mechanism connecting said bell crank lever with the axes of said reflectors and adapted to transmit to said reflectors through the cam and bell crank lever an oscillation on their axes parallel with the optical axis and a shutter mounted on said cam shaft and adapted to obscure the lens wholly during the reverse movement of said pairs of reflectors.

6. Cinematograph projector mechanism of the continuously moving film kind, comprising a framework, a main driving shaft mounted in said framework, a counter-shaft adapted to be driven from said main driving shaft, cam mechanism mounted on said counter-shaft, a second counter-shaft mounted in said framework, a film feeding sprocket mounted on said second counter-shaft, means for driving said counter-shaft from said cam shaft independently of the other mechanism, a bell crank lever pivotally mounted in said framework and adapted to be rocked on its pivot by said cam mechanism, a pair of reflectors pivotally mounted in said framework and inclined at an angle of 45° to the optical axis of projection, a second pair of reflectors similarly disposed to the first pair of reflectors and mounted on the axes of the said first pair of reflectors and adapted to maintain the optical axis from the light source to the film picture in a relatively constant position, a film gate mounted in said framework between said pairs of reflectors, link mechanism connecting said bell crank lever with the axes of said reflectors and adapted to transmit to said reflectors through the cam and bell crank lever an oscillation on their axes parallel with the optical axis and a shutter mounted in said framework and adapted to be actuated by the operating mechanism synchronously with said oscillating reflectors and said film feeding sprocket in such a manner that the reverse motion of said mirrors occurs wholly during a period of shutter obturation.

7. Cinematograph projector mechanism of the continuously moving film kind, comprising a framework, a main driving shaft mounted in said framework, means for continuously moving the film mounted in said framework and driven by said main shaft, a counter-shaft adapted to be driven from said main driving shaft, cam mechanism mounted on said counter-shaft, a bell crank lever pivotally mounted in said framework and adapted to be rocked on its pivot by said cam mechanism, a pair of reflectors pivotally mounted in said framework and inclined at an angle of 45° to the optical axis of projection, a second pair of reflectors similarly disposed to the first pair of reflectors and mounted on the axes of the said first pair of reflectors and adapted to maintain the optical axis from the light source to the film picture in a relatively constant position, a film gate mounted in said framework between said pairs of reflectors, link mechanism connecting said bell crank lever with the axes of said reflectors and adapted to transmit to said reflectors through the cam and bell crank lever an oscillation on their axes parallel with the optical axis, means for compensating for the curved path of the beam of light between the reflectors and a shutter mounted in said framework and adapted to be actuated by the operating mechanism synchronously with said oscillating reflectors and said film moving means in such a manner that the reverse motion of said reflectors occurs wholly during a period of shutter obturation.

8. Cinematograph projector mechanism of the continuously moving film kind, comprising a framework, a main driving shaft mounted in said framework, means for continuously moving the film mounted in said framework and driven by said main shaft, a counter-shaft adapted to be driven from said main driving shaft, cam mechanism mounted on said counter-shaft, a bell crank lever pivotally mounted in said framework and adapted to be rocked on its pivot by said cam mechanism, a bracket pivotally mounted in said framework, a pair of reflectors carried by said bracket and inclined at an angle of 45° to the optical axis of projection, a second pair of reflectors similarly disposed to the first pair of reflectors and mounted on the axes of the said first pair of reflectors and adapted to maintain the optical axis from the light source to the film picture in a relatively constant position, a film gate mounted in said framework between said pairs of reflectors, link mechanism connecting said bell crank lever with the axes of said reflectors and adapted to transmit to said reflectors through the cam and bell crank lever an oscillation on their axes parallel with the optical axis, an arm mounted on the bracket carrying said reflectors, a secondary cam mounted on said cam shaft and adapted to engage said bracket arm to turn the bracket on its pivots and to move said reflecting surfaces laterally to compensate for the curved path of the beam of light between the reflecting reflectors, and a shutter mounted in said framework and adapted to be actuated by the operating mechanism synchronously with said oscillating reflectors and said film moving means in such a manner that the reverse motion of said reflectors occurs wholly during a period of shutter obturation.

9. Cinematograph projector mechanism of the continuously moving film kind, comprising a framework, a main driving shaft mounted in said framework, a counter-shaft adapted to be driven from said main driving shaft, cam mechanism mounted on said counter-shaft, a second counter-shaft mounted in said framework, a film feeding sprocket mounted on said second counter-shaft, means for driving said counter-shaft from said cam shaft independently of the other mechanism, a bell crank lever pivotally mounted in said framework and adapted to be rocked on its pivot by said cam mechanism, a bracket pivotally mounted in said framework, a pair of reflectors carried by said bracket and inclined at an angle of 45° to the optical axis of projection, a second pair of reflectors similarly disposed to the first pair of reflectors and mounted on the axes of the said first pair of reflectors and adapted to maintain the optical axis from the light source to the film picture in a relatively constant position, a film gate mounted in said framework between said pairs of reflectors, link mechanism connecting said bell crank lever with the axes of said reflectors and adapted to transmit to said reflectors through the cam and bell crank lever an oscillation on their axes parallel with the optical axis, an arm mounted on the bracket carrying said reflectors, a secondary cam mounted on said cam shaft and adapted to engage said bracket arm to turn the bracket on its pivots and to move said reflecting surfaces laterally to compensate for the curved path of the beam of light between the reflectors and a shutter mounted on said cam shaft and adapted to obscure the lens wholly during the reverse movement of said pairs of reflectors.

In testimony whereof I have signed my name to this specification.

G. B. BOWELL.